Patented Sept. 19, 1939

2,173,486

UNITED STATES PATENT OFFICE 2,173,486

OXAZOLE TRIMETHINECYANINES

Wilhelm Schneider, Dessau, Germany, assignor, by mesne assignments, to Agfa Ansco Corporation, Binghamton, N. Y., a corporation of Delaware No Drawing. Application June 24, 1936, Serial No. 87,038. In Germany December 17, 1932

2 Claims. (Cl. 260—240)

My present invention relates to oxazole-trimethinecyanines. It is a continuation in part of my application Serial No. 702,260 filed December 13, 1933.

One of its objects is to provide a new class of oxazole-trimethinecyanines. Another object are the benzoxazole-trimethinecyanines substituted in the benzene nucleus whether substituted or unsubstituted at the central carbon atom of the trimethenyl chain. Further objects will be seen from the detailed specification following hereafter.

It has already been proposed to use the unsubstituted benzoxocarbocyanine for sensitizing silver halide emulsions. The sensitizing action of this dye for the yellowish-green region of the spectrum, however, is very poor; its maximum is in the bluish-green region of the spectrum and the general sensitivity of the emulsions is but feebly increased.

According to this invention, photographic silver halide emulsions are sensitized by incorporating in the emulsion a symmetrical or unsymmetrical benzoxazole-trimethinecyanines dye which is substituted in one or both benzene rings of the benzoxazole nuclei and may contain a substituent in the trimethine chain linking the benzoxazole nuclei. Suitable substituents for the benzene rings of the benzoxazole nuclei are: alkyl groups, hydroxy groups, alkoxy groups, halogens and amino-groups; the hydrogen atoms of the amino-groups may be substituted by alkyl groups, acetyl groups, propionyl groups or other organic acid radicals.

The substituted dyes used in accordance with the invention have been found to be well suited for the orthochromatic sensitization of photographic silver halide emulsions. As compared with the unsubstituted benzoxocarbocyanines, they produce a maximum of sensitivity which is displaced towards the long wave region of the spectrum. Furthermore, the aforesaid substitued dyes are distinguished by an increased intensity of sensitization.

The dyes can be prepared according to known methods. For example, symmetrical benzoxazole-trimethinecyanines may be made by condensing a quaternary ammonium salt of a corresponding benzoxazole having in 2-position a methyl group capable of reaction, with a trialkyl ester of orthoformic acid or with an anhydrous salt of formic acid. Unsymmetrical benzoxocarbocyanines may be made by condensing a 2-methylbenzoxazole quaternary ammonium salt with diphenylformamidine in presence of acetic anhydride to form an intermediate product which is then condensed with a different 2-methylbenzoxazole quaternary ammonium salt to form the dye. The symmetrical dyes substituted at the central carbon atom of the trimethenyl chain are obtainable by condensing a 2-methylbenzoxazole quaternary ammonium salt with a trialkyl-ortho-carboxylic acid ester, and the unsymmetrical dyes substituted at the central carbon atom are obtainable by condsensing a 2-methylbenzoxazole quaternary ammonium salt with an alkyl ester of an arylated thioimide to an intermediate product and condensing this intermediate product with a different quaternary ammonium salt. If in the latter case the same quaternary ammonium salt is used as it is used for the production of the intermediate product a symmetrical dye is obtained. Thus the trimethenyl chain may be substituted at the central carbon atom by alkyl, aryl or aralkyl. The substituted benzoxazoles required as parent materials for the manufacture may be obtained by distillation of a correspondingly substituted orthoacetaminophenol, whereby there distil at first water and then the substituted benzoxazole.

The dyes are obtainable according to the desired solubility in form of the bromide, iodide, perchlorate, and so on. For sensitizing a silver halide emulsion they are used in a quantity such as is usual for the known sensitizing dyes. This quantity may amount to about 10 to 40 milligrams per kilo of emulsion ready for being cast which contains about 9 per cent of gelatin, 4.5 per cent of silver halide, and the rest water. However, the invention is not limited to the quantities just indicated and the most suitable amount can be found in each case by a few comparative experiments. The dyes may be added to the emulsion in the form of solutions. Suitable solvents are the alcohols, for instance methyl alcohol or ethyl alcohol, which may be used anhydrous or diluted with water. The dyes may be incorporated in the emulsion during any stage of its production; however, they are preferably added to the finished emulsion before casting.

The dyes may likewise be added by bathing the finished photographic material in a bath in which the dye is dissolved. Such a treatment may be as follows: The photographic material to be sensitized is bathed in a solution containing 1 milligram of the sensitizing dye in 50 to 100 cc. of an aqueous solution of methanol of 50 per cent strength for about 5 minutes. The material is then dried, whereupon it is ready for use.

The following examples describe the manufacture of some sensitizing dyes for use in accordance with the invention and their sensitizing action on a photographic silver halide emulsion:

*Example 1.*—The dye bis-[3-methyl-6-dimethylamino-benzoxazole - (2) ] - trimethinecyanine iodide corresponding with the formula

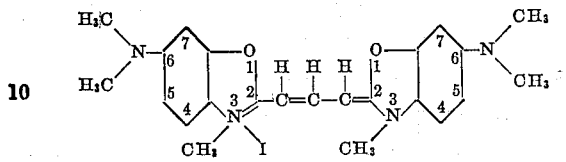

is obtained by heating a mixture of 4 grams of 6-dimethylamino-2-methylbenzoxazole dimethylsulfate, 3 cc. of orthoformic acid and 10 cc. of pyridine to about 120° C. for about 15 minutes. The hot pyridine solution is mixed with a dilute solution of potassium iodide and the dye which separates is filtered off after cooling and recrystallized from alcohol.

The alcoholic solution of the dye has an absorption maximum at a wave length of about 550 μμ.

A silver bromide emulsion containing about 4 to 5 per cent of silver iodide is sensitized to waves from about 500 to 650 μμ with a maximum at about 590 μμ by incorporation of the dye.

*Example 2.*—The dye bis-[3-methyl-5-acetylamino-benzoxazole-(2) ]-β-methyl-trimethinecyanine perchlorate corresponding with the formula

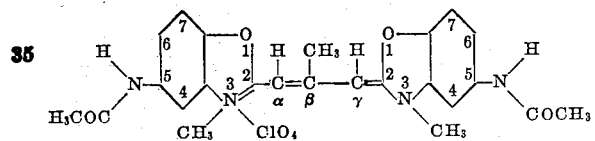

may be prepared by heating 4 grams of 2-methyl-5-acetylamino-benzoxazole dimethylsulfate and 3 cc. of triethyl orthoacetate in 10 cc. of pyridine to 130° C. for about 1 hour. The dye is precipitated by the addition of an aqueous solution of sodium perchlorate. The dye is separated by filtration and is recrystallized from alcohol.

The alcoholic solution of the dye has an absorption maximum at a wave length of about 502 μμ.

A silver bromide emulsion containing about 4 to 5 per cent of silver iodide is sensitized to waves from about 500 to 600 μμ with a maximum at about 550 μμ by incorporation of the dye.

*Example 3.*—The dye bis-[3-methyl-6-hydroxy-benzoxazole-(2)]-trimethinecyanine perchlorate corresponding with the formula

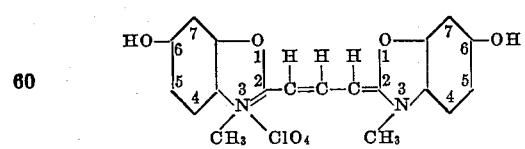

may be prepared by heating 3 grams of 2-methyl-6-hydroxy-benzoxazole dimethylsulfate, 2 cc. of triethyl orthoformate and 10 cc. of pyridine to 130° C. for about 20 minutes. The dye is precipitated by the addition of an aqueous solution of sodium perchlorate. The dye is separated by filtration and recrystallized from alcohol.

The alcoholic solution of the dye has an absorption maximum at a wave length of about 503 μμ.

A silver bromide emulsion containing about 4 to 5 per cent of silver iodide is sensitized to waves from about 500 to 610 μμ with a maximum at about 550 μμ by incorporation of the dye.

*Example 4.*—The dye bis-[3.5-dimethyl-benzoxazole-(2) ]-β-ethyl-trimethinecyanine perchlorate corresponding with the formula

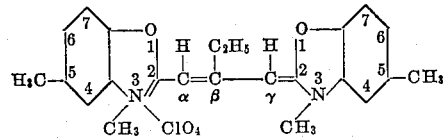

may be prepared by heating a mixture of 3 grams of 2.5-dimethyl-benzoxazole dimethylsulfate, 3 cc. of triethyl orthopropionate and 10 cc. of pyridine to 135° C. for about 1 hour. The dye is precipitated by the addition of an aqueous solution of sodium perchlorate. The dye is separated by filtration and recrystallized from alcohol.

The alcoholic solution of the dye has an absorption maximum at a wave length of about 496 μμ. A silver bromide emulsion containing about 4 to 5 per cent of silver iodide is sensitized to waves from about 500 to 590 μμ with a maximum at about 540 μμ by incorporation of the dye.

*Example 5.*—The dye bis-[3.5-dimethyl-benzoxazole-(2) ]-β-thienyl - trimethinecyanine perchlorate corresponding with the formula

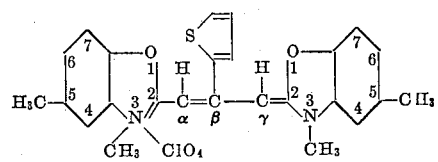

may be prepared by heating 3 grams of 2-methyl-5-methyl-benzoxazole dimethylsulfate, 4 cc. of triethyl orthothiophenate and 10 cc. of pyridine to 135–140° C. for about 1 hour. The dye is precipitated by means of an aqueous solution of sodium perchlorate. The dye is separated by filtration and is recrystallized from alcohol.

The alcoholic solution of the dye has an absorption maximum at a wave length of about 515 μμ.

A silver bromide emulsion containing about 4 to 5 per cent of silver iodide is sensitized to waves from about 515 μμ to 600 μμ with a maximum at about 560 μμ by incorporation of the dye.

*Example 6.*—The dye bis-[3-methyl-6-methoxy - benzoxazole -(2) ]-β - ethyl - trimethinecyanine bromide corresponding with the formula

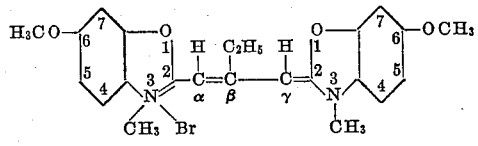

may be prepared by heating 3 grams of 2-methyl-6-methoxy-benzoxazole dimethylsulfate, 3 cc. of triethyl orthopropionate and 10 cc. of pyridine to 135° C. for about 1 hour. The dye is precipitated by the addition of a solution of sodium bromide. The dye is separated by filtration and recrystallized from alcohol.

The alcoholic solution of the dye has an absorption maximum at a wave length of about 512 μμ.

A silver bromide emulsion containing about 4 to 5 per cent of silver iodide is sensitized to waves from about 515 to 605 μμ with a maximum at about 550 μμ.

*Example 7.*—The dye bis -[3-ethyl-5.6-dimethyl-benzoxazole-(2)]-trimethinecyanine iodide corresponding with the formula

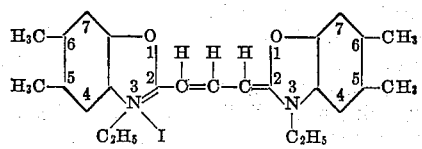

may be prepared by heating 3 grams of 2.5.6-trimethylbenzoxazole ethiodide, 1.5 cc. of triethyl orthoformate, and 10 cc. of pyridine to 140° C. for about 20 minutes. Then there is added a solution of potassium iodide. The dye which separates in cooling is filtered off and may be recrystallized from alcohol.

The alcoholic solution of the dye has an absorption maximum at a wave length of about 498 $\mu\mu$.

A silver bromide emulsion containing about 4 to 5 per cent of silver iodide is sensitized for waves from about 500 to 560 $\mu\mu$ with a maximum at about 525 $\mu\mu$ by incorporation of the dye.

*Example 8.*—The dye bis-[3-ethyl-5.6-di-methyl-benzoxazole-(2)]-β-methyl-trimethinecyanine iodide corresponding with the formula

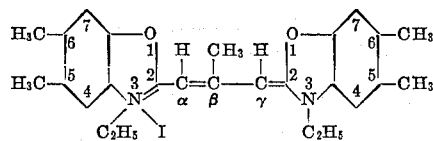

may be prepared by heating 3 grams of 2.5.6-trimethyl-benzoxazole ethiodide, 3 cc. of triethyl orthoacetate, and 10 cc. of pyridine for about 1 hour to 135° C. Then there is added a solution of potassium iodide. The dye which separates in cooling is filtered off and may be recrystallized from alcohol.

The alcoholic solution of the dye has an absorption maximum at a wave length of about 503 $\mu\mu$.

A silver bromide emulsion containing about 4 to 5 per cent of silver iodide is sensitized for waves from about 500 to 565 $\mu\mu$ with maxima at about 552 $\mu\mu$ and 523 $\mu\mu$ by incorporation of the dye.

*Example 9.*—The dye bis-[3-ethyl-5.6-di-methbenzoxazole-(2)]-β-ethyl-trimethinecyanine iodide corresponding with the formula

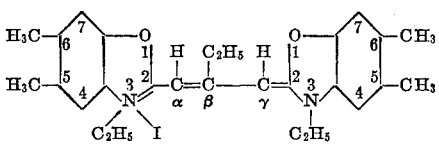

may be prepared by heating 3 grams of 2.5.6-trimethyl-benzoxazole ethiodide, 1.5 cc. of triethyl orthopropionate and 10 cc. of pyridine for about 1 hour to 135° C. Then there is added a solution of potassium iodide. The dye which separates in cooling is filtered off and may be recrystallized from alcohol.

The alcoholic solution of the dye has an absorption maximum at a wave length of about 506 $\mu\mu$.

A silver bromide emulsion containing about 4 to 5 per cent of silver iodide is sensitized for waves from about 500 to 565 $\mu\mu$ with a maximum at about 535 $\mu\mu$ by incorporation of the dye.

*Example 10.*—The dye bis-[3-ethyl-6-methyl-benzoxazole-(2)]-trimethinecyanine iodide corresponding with the formula

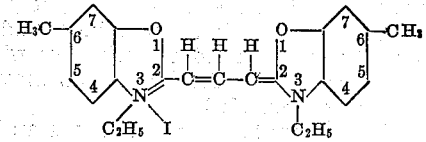

may be prepared by heating 3 grams of 2.6-dimethylbenzoxazole ethiodide, 1.5 cc. of triethyl orthoformate, and 10 cc. of pyridine to 140° C. for about 20 minutes. Then there is added a solution of potassium iodide. The dye which separates in cooling is filtered off and may be recrystallized from alcohol.

An alcoholic solution of the dye has an absorption maximum at a wave length of about 495 $\mu\mu$.

A silver bromide emulsion containing about 4 to 5 per cent of silver iodide is sensitized for waves from about 490 to 580 $\mu\mu$ with a maximum at about 523 $\mu\mu$ by incorporation of the dye.

*Example 11.*—The dye bis-[3-ethyl-6-methyl-benzoxazole-(2)]-β-methyl-trimethinecyanine iodide corresponding with the formula

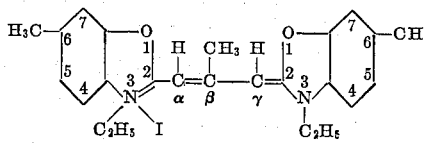

may be prepared by heating 3 grams of 2.6-dimethylbenzoxazole ethiodide, 1.5 cc. of triethyl orthoacetate, and 10 cc. of pyridine to 135° C. for about 1 hour. Then there is added a solution of potassium iodide. The dye which separates in cooling is filtered off and may be recrystallized from alcohol.

An alcoholic solution of the dye has an absorption maximum at a wave length of about 500 $\mu\mu$.

A silver bromide emulsion containing 4 to 5 per cent of silver iodide is sensitized for waves from about 500 to 560 $\mu\mu$ with a maximum at about 525 $\mu\mu$ by incorporation of the dye.

*Example 12.*—The dye bis-[3-ethyl-6-methyl-benzoxazole-(2)]-β-ethyl-trimethinecyanine iodide corresponding with the formula

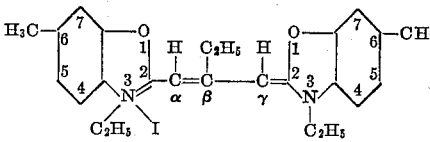

may be prepared by heating 3 grams of 2.6-dimethylbenzoxazole ethiodide, 1.5 cc. of triethyl orthopropionate, and 10 cc. of pyridine to 135° C. for about 1 hour. Then there is added a solution of potassium iodide. The dye which separates in cooling is filtered off and may be recrystallized from alcohol.

The alcoholic solution of the dye has an absorption maximum at a wave length of about 503 $\mu\mu$.

A silver bromide emulsion containing about 4 to 5 per cent of silver iodide is sensitized for waves from about 500 to 560 $\mu\mu$ with a maximum at about 525 $\mu\mu$ by incorporation of the dye.

*Example 13.*—The dye bis-[3-ethyl-6-methoxy-benzoxazole-(2)]-trimethinecyanine iodide corresponding with the formula

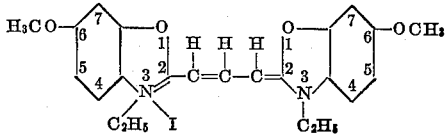

may be prepared by heating 3 grams of 2-methyl-6-methoxy-benzoxazole ethiodide, 1.5 grams of triethyl orthoformate, and 10 cc. of pyridine to 140° C. for about 20 minutes. Then there is added a solution of potassium iodide. The dye which separates in cooling is filtered off and may be recrystallized from alcohol.

The alcoholic solution of the dye has an absorption maximum at a wave length of about 506 $\mu\mu$.

A silver bromide emulsion containing about 4 to 5 per cent of silver iodide is sensitized for waves from about 500 to 610 $\mu\mu$ with a maximum at about 540 $\mu\mu$ by incorporation of the dye.

*Example 14.*—The dye bis-[3-methyl-5-chloro-benzoxazole-(2)]-trimethinecyanine iodide corresponding with the formula

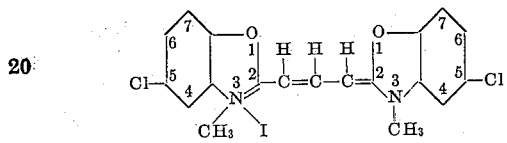

may be prepared by heating 3.5 grams of 2-methyl-5-chloro-benzoxazole methiodide with 1.5 cc. of triethyl-orthoformate and 10 cc. of pyridine at 140° C. for about 20 minutes. Then there is added a solution of potassium iodide. After cooling, the dye which separates is filtered; it may be recrystallized from alcohol.

An alcoholic solution of the dye has an absorption maximum at a wave length of about 494 $\mu\mu$.

A silver bromide emulsion containing about 4 to 5 per cent of silver iodide is sensitized by incorporation of the dye to light of wave lengths extending from those to which the emulsion is initially sensitive to about 550 $\mu\mu$ wave length with a maximum at about 515 $\mu\mu$.

*Example 15.*—2.75 grams of 2-methyl-benzoxazole ethiodide, 2 grams of diphenylformamidine and 10 cc. of acetic anhydride are heated together to boiling for 5 minutes, the reaction mixture is then cooled and ether is added. There is precipitated an intermediate product which is recrystallized from alcohol.

3.8 grams of this intermediate product and 3.1 grams of 5-methoxy-2-methyl-benzoxazole methiodide are heated together at 190° C. in 15 cc. of pyridine with addition of 1 cc. of piperidine. The dye which separates on cooling is recrystallized from alcohol. It is presumed to be [3-methyl-5-methoxy-benzoxazole-(2)]-[3-ethyl-benzoxazole-(2)]-trimethinecyanine iodide and has probably the following formula

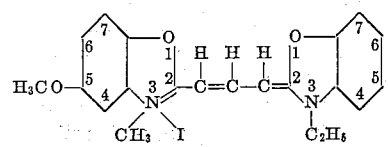

An alcoholic solution of the dye has an absorption maximum at a wave length of about 490 $\mu\mu$.

The dye renders silver halide emulsions sensitive to light of wave lengths extending from 500 to 570 $\mu\mu$ with a maximum at about 520 $\mu\mu$.

What I claim is:

1. The dye bis-[3-ethyl-5.6-dimethyl-benzoxazole-(2)]-β-methyl-trimethinecyanine iodide.

2. Benzoxazole-trimethinecyanine salts having the following constitution

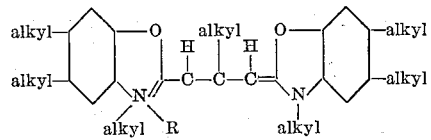

wherein alkyl is selected from the class consisting of methyl and ethyl and wherein R is an anion capable of precipitating the dye.

WILHELM SCHNEIDER.